United States Patent [19]

Shiun et al.

[11] 4,348,762
[45] Sep. 7, 1982

[54] CIRCUIT FOR CORRECTING DATA READING CLOCK PULSES

[75] Inventors: Toshimi Shiun; Hideo Fujii; Yoshio Kizaki, all of Toda, Japan

[73] Assignee: Clarion Co., Ltd., Tokyo, Japan

[21] Appl. No.: 176,974

[22] Filed: Aug. 11, 1980

[30] Foreign Application Priority Data

Sep. 14, 1979 [JP] Japan .................. 54-117375

[51] Int. Cl.³ .................................. H04L 7/00
[52] U.S. Cl. ........................ 371/47; 371/61; 375/118
[58] Field of Search .............. 371/47, 61, 5; 375/118

[56] References Cited

U.S. PATENT DOCUMENTS

| | | | |
|---|---|---|---|
| 3,530,663 | 9/1970 | Marti | 371/61 |
| 3,573,727 | 4/1971 | Freeny | 375/118 |
| 3,646,517 | 2/1972 | Waters et al. | 371/47 |
| 3,840,855 | 10/1974 | Ameau et al. | 371/5 |
| 3,938,086 | 2/1976 | Valbonesi | 375/118 |
| 4,203,003 | 5/1980 | Kline | 375/118 |
| 4,218,771 | 8/1980 | Hogge, Jr. | 371/61 |
| 4,232,387 | 11/1980 | Cottatellucci | 371/47 |

*Primary Examiner*—Charles E. Atkinson

[57] ABSTRACT

A circuit for correcting data reading clock pulses, comprising a data reading device for reading data in response to clock pulses of a group or groups of different phases selected by one or more switches, a detector adapted to detect mis-reading of the data, a switch means and a switch control means. The switch control means is actuated by a detection signal of mis-reading to control the switch means so as to select clock pulse group or groups desired for accurate reading of the data.

4 Claims, 5 Drawing Figures

CIRCUIT FOR CORRECTING DATA READING CLOCK PULSES

BACKGROUND OF THE INVENTION

1. Field of the Invention

This invention relates to a circuit for correcting data reading clock pulses, and more particularly to an improved circuit for correcting data reading clock pulses which is capable of eliminating mis-reading of data due to timing error of the data reading clock pulses.

2. Description of the Prior Art

In general, reading clock pulses are required to read n-bits of data within a period of time T and the timing of the pulses must be synchronized with an external signal. To this end, a synchronizing signal is generally required. Where no special synchronizing signal is provided for the data reading clock pulses, a start bit is formed, as dummy data, in the data to be read, so as to act as the desired synchronizing signal.

In the former case where a synchronizing signal per se is used, however, it is quite difficult to have the reading clock pulses coincide with the synchronizing signal when mass-produced digital circuits etc. are employed. This has been a problem to be solved. On the other hand, the latter case where a start bit is used has the disadvantage that an additional bit needs to be inserted in a limited time space and a time space for one data bit is reduced.

OBJECTS OF THE INVENTION

It is therefore an object of the present invention to provide a circuit for correcting data reading clock pulses which is capable of obviating the aforesaid disadvantages.

It is a more specific object of the present invention to provide a circuit for correcting data reading clock pulses which is capable of eliminating mis-reading of data without using a special synchronizing signal, a start bit, etc. and by automatically selecting optimum clock pulses from roughly synchronized n-phase clock pulse groups.

SUMMARY OF THE INVENTION

A circuit for correlating data reading clock pulses, including a clock pulse generator for generating a plurality of groups of clock pulses different in phases, a switch for selecting and outputting one or more groups of clock pulses from the plurality of groups of clock pulses, a device for reading data in response to one or more groups of clock pulses selected by the switch, a detector for detecting mis-reading of the data and outputting a detection signal, and a switch control responsive to the detection signal to control the switch so as to continue selection of another group or groups of clock pulses until correct data reading is accomplished.

DESCRIPTION OF THE PREFERRED EMBODIMENT

Figure 1:
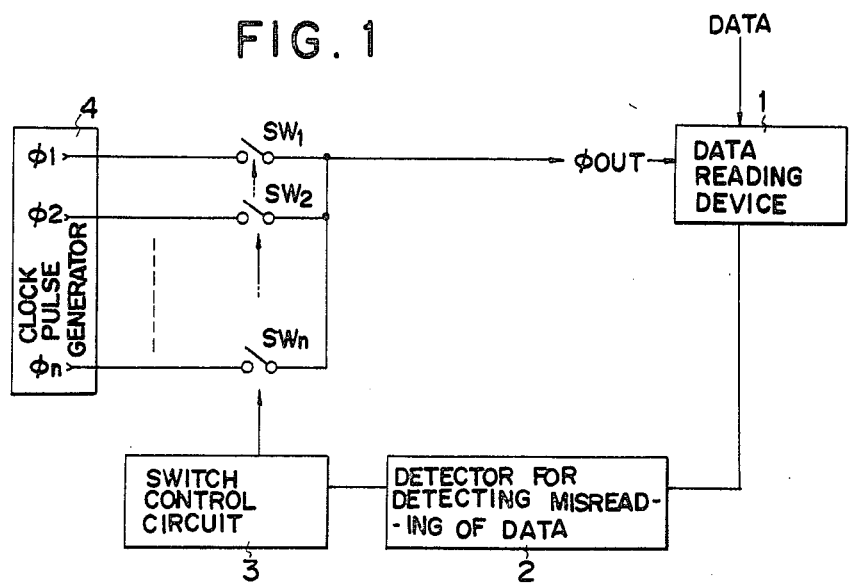
FIG. 1 is a block diagram of one form of a circuit for correcting data reading clock pulses in accordance with the present invention.

Referring now to the accompanying drawings, there is illustrated one preferred mode of the invention. In FIG. 1, numeral 1 designates a data reading device such as a known tape reader. Numeral 2 is a detector for detecting misreading of data, 3 is a switch control circuit, $SW_1$ to $SW_n$ are switches and 4 is a clock pulse generator for generating clock pulses of groups $\phi_1$ to $\phi_n$ of n different phases each generally synchronized with a desired external signal. A time of one data bit is divided into n parts to form the clock pulse groups $\phi_1$ to $\phi_n$ of n phases. Out of these clock pulse groups $\phi_1$ to $\phi_n$, a given number of clock pulse groups or groups are selected by corresponding switches $SW_1$ to $SW_n$ closed by the switch control circuit 3. In the illustrated embodiment, one clock pulse group is selected and the selected clock pulse $\phi$out is outputted to the data reading device 1.

If there is an error in data reading by the device 1 effected in response to the clock pulse $\phi$out, the detector detects the error and the switch control circuit 3 is actuated by the detection signal so that the switch in a closed position is opened and another switch is closed to select another clock pulse group. Thus, the switch control circuit 3 automatically goes on scanning of the switches, closing the switches sequentially, in response to the detection signals of mis-reading of the data, until a clock pulse $\phi$out desired for accurate data reading is obtained. The detector 2 may be a known detector which is adapted to detect an error through an output of a parity check or continuous-transmission check of the read-out data.

Figure 2:
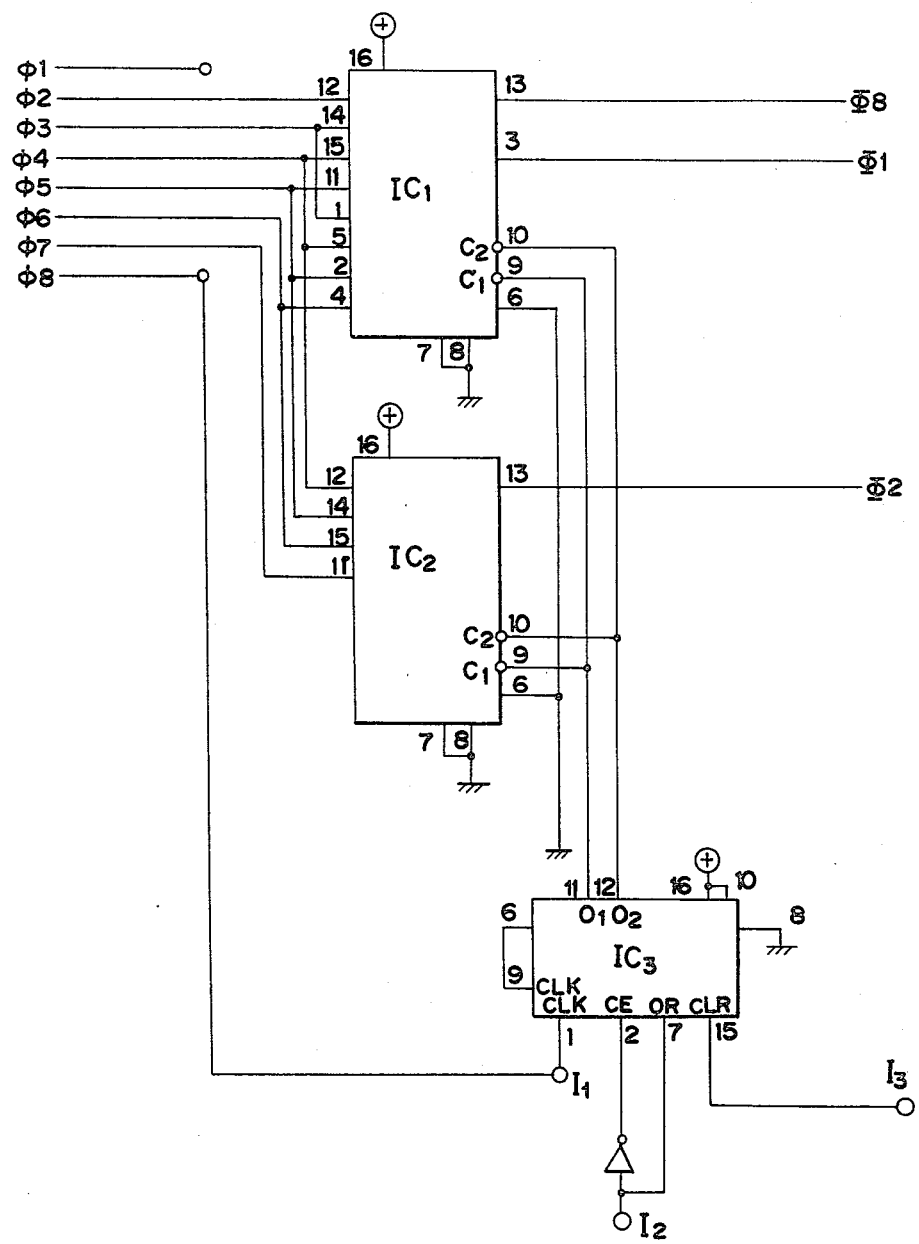
FIG. 2 is a block diagram of one specific form of a principal portion of the circuit illustrated in FIG. 1.

FIG. 2 illustrates one example of an arrangement of the switches SW and the switch control circuit 3 employing IC circuits. In the FIG., $IC_1$ and $IC_2$ are analog switch circuits and have functions equivalent to those of the switches $SW_1$ to $SW_n$. In the illustrated arrangement, the circuit $IC_1$ receives input clock pulses $\phi_2$ to $\phi_7$ and selectively outputs one of the clock pulses $\phi_2$ to $\phi_5$ to an output $\Phi_8$ and outputs one of the clock pulses $\phi_3$ to $\phi_6$ to an output $\Phi_1$. The circuit $IC_2$ receives inputs $\phi_4$ to $\phi_7$ and outputs one of the clock pulses $\phi_4$ to $\phi_7$ to an output $\Phi_2$.

$IC_3$ is a counter having a function of the switch control circuit 3 as mentioned above. An input terminal $I_2$ of the counter $IC_3$ receives a detection output (for example "0" for mis-reading and "1" for correct reading) from the detector 2, while an input terminal $I_1$ receives a clock pulse $\phi_8$. $I_3$ is a reset terminal. $O_1$ and $O_2$ are output terminals and connected to control terminals $C_1$ and $C_2$ of the analog switch circuit, respectively. Numerals indicated around the respective IC circuit $IC_1$ to $IC_3$ designate terminal numbers of IC chips of the respective circuits.

When mis-reading occurs, the detection output "0" is applied to the input terminal $I_2$ of the counter $IC_3$ and the counter $IC_3$ starts to count the clock pulses $\phi_8$ in response to the detection output. If the mis-reading remains uncorrected, for example, after eight clock pulses have been counted, i.e., the data reading device has failed to correctly read the data eight times, level conditions of the output terminals 01 and 02 are changed and, in response thereto, each of the analog switch circuits changes respective input clock pulse to a different one, namely, an input clock pulse which lags or leads by one phase. Thus, scanning of input clock pulses is repeated until the mis-reading of the data is eliminated.

Figure 3:
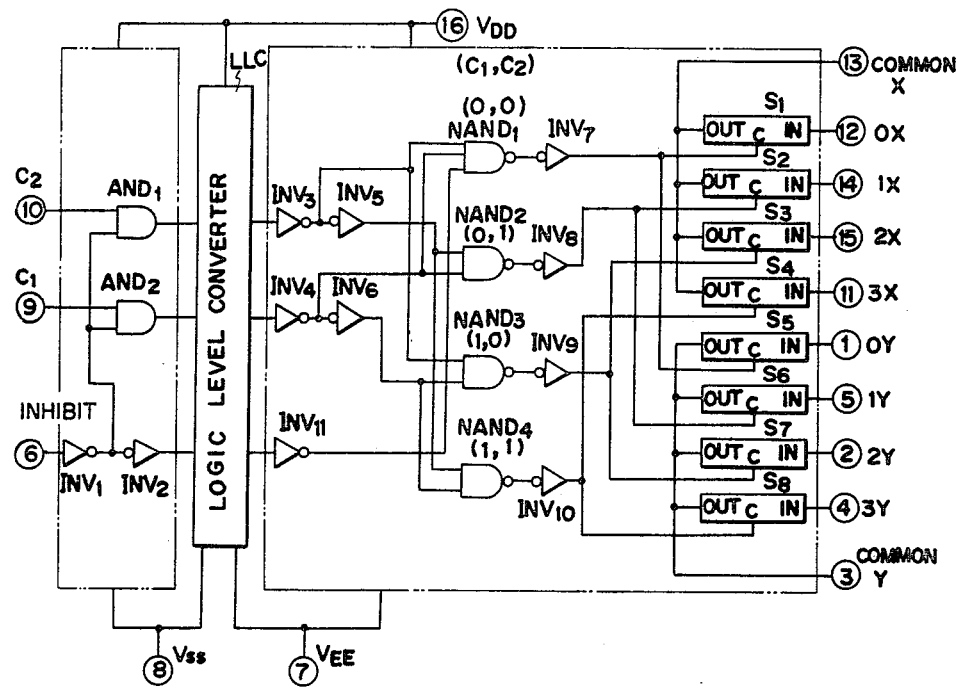
FIG. 3 shows $IC_1$ and $IC_2$ of FIG. 2.
Figure 4:
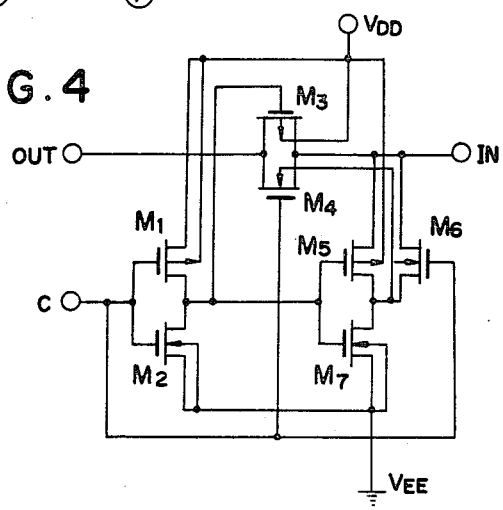
FIG. 4 shows one of the switch circuits $S_1$-$S_8$ of FIG. 3.

FIG. 3 illustrates specific formation of the analog switch circuits $IC_1$ and $IC_2$. In the figure, $AND_1$ and $AND_2$ are AND circuits, $INV_1$ to $INV_{11}$ are inverters, $NAND_1$ to $NAND_4$ are NAND circuits, LLC is a logic level converter circuit, and $S_1$ to $S_8$ are switch circuits each of which is formed, for example, of MOS transistors $M_1$ to $M_7$. The switch circuit of FIG. 4 is a standard switching circuit which operates in the conventional manner. One of four groups of clock pulses OX to 3X different in phases applied to terminals 12, 14, 15 and 11 respectively is selected to be outputted through a COMMON terminal 13, depending on conditions of signals $C_1$ and $C_2$ applied to terminals 9 and 10, i.e., (0,0), (0,1), (1,0) or (1,1). Similarly, one of four groups of clock pulses 0Y to 3Y different in phases, applied to terminals 1, 5, 2 and 4 respectively is selected to be outputted through a COMMON terminal depending on the conditions of the signals $C_1$ and $C_2$.

Figure 5:
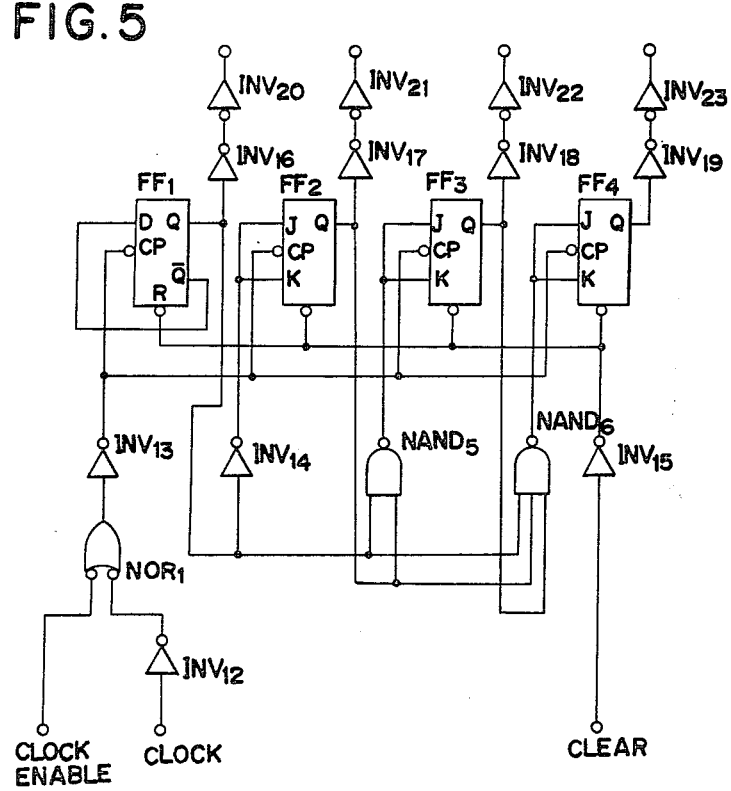
FIG. 5 shows $IC_3$ of FIG. 2.

FIG. 5 illustrates one specific form of one of two synchronous binary counters (four digits) constituting the counter $IC_3$. In the figure, $INV_{12}$ to $INV_{23}$ are inverters, $NOR_1$ is a NOR circuit, $NAND_5$ and $NAND_6$ are NAND circuits and $FF_1$ to $FF_4$ are flip-flop circuits. One of the binary counters counts occurrences of mis-reading of the data, and the other is responsive thereto to output a clock selecting signal through the output terminals $O_1$ and $O_2$ of the counter $IC_3$.

Where various data is superposed on a video signal as in a toll TV broadcast, in general, a horizontal synchronizing signal is utilized as a synchronizing signal for the data, too. However, circuits for separating the horizontal synchronizing signal are usually mass-produced ones and have significant variances therebetween, so that it is quite difficult for all the circuits to generate data clock pulses at desired timing. In such a case, the circuit of the present invention can also be employed with advantages to achieve desired timing.

Further in accordance with the present invention, there is no need to provide a start bit or stop bit within a limited time space so that a time per one bit data can be utilized effectively.

We claim:

1. A circuit for correcting data reading clock pulses, which comprises:
    a means for generating a plurality of groups of clock pulses of different phases;
    a switch means for selecting and outputting one or more groups of clock pulses from said plurality of groups of clock pulses;
    a means for reading data in response to said one or more groups of clock pulses selected by said switch means;
    a means for detecting mis-reading of the data and outputting a detection signal indicating mis-reading; and
    a switch control means responsive to said detection signal to control said switch means so as to repeatedly select another group or groups of clock pulses until correct data reading is accomplished as determined by absence of said detection signal.

2. A circuit for correcting data reading clock pulses as claimed in claim 1, wherein said switch means includes a plurality of switches which are adapted to receive, at their respective inputs, corresponding groups of clock pulses, respectively, and adapted to be controlled by said switch control means so as to be closed or opened in response to the detection signal of mis-reading of the data.

3. A circuit for correcting data reading clock pulses as claimed in claim 1, wherein said switch control means is formed of a counter, said counter being adapted to count one group of clock pulses allocated thereto out of said plurality of groups of clock pulses and cause said switch means to select another group or groups of clock pulses of different phases when the mis-reading of the data remains uncorrected after said counter has counted a predetermined number of said clock pulses allocated thereto.

4. A method for correcting data reading clock pulses which comprises:
    generating a plurality of groups of clock pulses of different phases;
    selecting one or more groups of clock pulses from said plurality of groups of clock pulses;
    reading data in response to the selected one or more groups of clock pulses;
    detecting mis-reading of the data; and
    repeatedly selecting another group or groups of clock pulses, upon detection of mis-reading, until correct data reading is accomplished.

* * * * *